United States Patent
Delgoshaei et al.

(10) Patent No.: US 11,644,206 B2
(45) Date of Patent: *May 9, 2023

(54) HVAC SYSTEM PROGNOSTICS AND DIAGNOSTICS BASED ON TEMPERATURE RISE OR DROP

(71) Applicant: Lennox Industries Inc., Richardson, TX (US)

(72) Inventors: Payam Delgoshaei, Addison, TX (US); Glenn W. Kowald, Carrollton, TX (US); Eric Berg, The Colony, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,781

(22) Filed: Jan. 24, 2022

(65) Prior Publication Data

US 2022/0146170 A1    May 12, 2022

Related U.S. Application Data

(63) Continuation of application No. 16/907,915, filed on Jun. 22, 2020, now Pat. No. 11,268,721.

(51) Int. Cl.
*G05B 19/042* (2006.01)
*F24F 11/38* (2018.01)
(Continued)

(52) U.S. Cl.
CPC ............... *F24F 11/38* (2018.01); *F24D 5/04* (2013.01); *F24F 11/63* (2018.01); *F25B 41/31* (2021.01);
(Continued)

(58) Field of Classification Search
CPC ........ F24F 11/38; F24F 11/63; F24F 2110/10; F24F 11/30; F25B 41/31; F25B 45/00;
(Continued)

(56) References Cited

U.S. PATENT DOCUMENTS 6,223,544 B1 * 5/2001 Seem ................. F24F 11/30
236/94
2004/0109477 A1 * 6/2004 Lee ..................... H04L 69/165
370/535

(Continued)

OTHER PUBLICATIONS

Schein, J., Bushby, S.T., Castro, N.S. and House, J.M., 2006. A rule-based fault detection method for air handling units. Energy and buildings, 38(12), pp. 1485-1492. (Year: 2006).*

*Primary Examiner* — Alicia M. Choi
(74) *Attorney, Agent, or Firm* — Baker Botts L.L.P.

(57) ABSTRACT

An HVAC system includes a heating element, a discharge air temperature sensor, and a return air temperature sensor. A controller of the HVAC system determines that the HVAC system has been operating in the heating mode for at least a predefined amount of time. The controller receives measurements of the discharge air temperature and the return air temperature. A temperature rise value is determined using the discharge air temperature and return air temperature. If the temperature rise value is less than a predefined minimum threshold value, the controller determines that a first fault of the HVAC system is detected and provides a corresponding alert. If the temperature rise value is greater than a predefined maximum threshold value, the controller determines that a second fault of the HVAC system is detected and provides a corresponding alert.

15 Claims, 4 Drawing Sheets

(51) Int. Cl.
　　*F24D 5/04*　　(2006.01)
　　*F24F 11/63*　　(2018.01)
　　*F25B 41/31*　　(2021.01)
　　*F25B 45/00*　　(2006.01)
　　*F25B 49/02*　　(2006.01)
　　*F24F 110/10*　(2018.01)

(52) U.S. Cl.
　　CPC .............. *F25B 45/00* (2013.01); *F25B 49/02* (2013.01); *G05B 19/042* (2013.01); *F24D 2240/00* (2013.01); *F24F 2110/10* (2018.01); *F25B 2345/003* (2013.01); *F25B 2700/2104* (2013.01); *G05B 2219/2614* (2013.01)

(58) Field of Classification Search
　　CPC ............... F25B 49/02; F25B 2345/003; F25B 2700/2104; F24D 5/04; F24D 2240/00; G05B 19/042; G05B 2219/2614; G05B 15/02

See application file for complete search history.

(56) References Cited

U.S. PATENT DOCUMENTS

| | | |
|---|---|---|
| 2010/0163634 A1 | 7/2010 | Klein et al. |
| 2010/0324741 A1 | 12/2010 | House et al. |
| 2012/0046909 A1 | 2/2012 | Dazai |
| 2012/0072029 A1 | 3/2012 | Persaud et al. |
| 2012/0109408 A1* | 5/2012 | Siy ............ B60L 1/02 701/1 |
| 2013/0158715 A1 | 6/2013 | Barton et al. |
| 2014/0316583 A1 | 10/2014 | Ambriz et al. |
| 2015/0159887 A1 | 6/2015 | Kadah et al. |
| 2016/0023649 A1* | 1/2016 | Muller ......... B60W 50/0097 701/22 |
| 2016/0116177 A1 | 4/2016 | Sikora et al. |
| 2017/0146226 A1* | 5/2017 | Storey ............ F21V 17/002 |
| 2017/0211836 A1 | 7/2017 | Perez et al. |
| 2017/0336091 A1 | 11/2017 | Arensmeier et al. |
| 2018/0032969 A1* | 2/2018 | Gillette ............ F24F 11/52 |
| 2019/0128547 A1 | 5/2019 | Li et al. |
| 2019/0242603 A1 | 8/2019 | Wei et al. |
| 2020/0080740 A1 | 3/2020 | Broker |
| 2020/0340697 A1 | 10/2020 | Simon et al. |
| 2021/0140650 A1 | 5/2021 | Wilson |
| 2021/0333007 A1* | 10/2021 | Conrad ............ G05B 15/02 |
| 2021/0396414 A1 | 12/2021 | Delgoshaei et al. |

* cited by examiner

1

HVAC SYSTEM PROGNOSTICS AND DIAGNOSTICS BASED ON TEMPERATURE RISE OR DROP

CROSS-REFERENCE TO RELATED APPLICATIONS

This application is a continuation of U.S. patent application Ser. No. 16/907,915 filed Jun. 22, 2020, by Payam Delgoshaei et al., and entitled "HVAC SYSTEM PROGNOSTICS AND DIAGNOSTICS BASED ON TEMPERATURE RISE OR DROP," which is incorporated herein by reference.

TECHNICAL FIELD

The present disclosure relates generally to heating, ventilation, and air conditioning (HVAC) systems and methods of their use. In particular, the present disclosure relates to HVAC system prognostics and diagnostics based on temperature rise or drop.

BACKGROUND

Heating, ventilation, and air conditioning (HVAC) systems are used to regulate environmental conditions within an enclosed space. In a cooling mode, air is cooled via heat transfer with refrigerant flowing through the HVAC system and returned to the enclosed space as cooled conditioned air. In a heating mode, air is heated via heat transfer with a heating element and returned to the enclosed space as heated conditioned air.

SUMMARY OF THE DISCLOSURE

In an embodiment, a heating, ventilation, and air conditioning (HVAC) system includes a heating element configured, when the HVAC system is operating in a heating mode, to heat a flow of air provided to a space. The HVAC system includes a discharge air temperature sensor positioned and configured to measure a discharge air temperature of the flow of air provided to the space. The HVAC system includes a return air temperature sensor positioned and configured to measure a return air temperature of air received from the space (e.g., by a duct of the HVAC system). A controller of the HVAC system determines that the HVAC system has been operating in the heating mode for at least a predefined amount of time. The controller receives the discharge air temperature measured by the discharge air temperature sensor and the return air temperature measured by the return air temperature sensor. A temperature rise value is determined based on the discharge air temperature and the return air temperature. In response to determining that the temperature rise value is less than a predefined minimum threshold value, the controller determines that a first fault of the HVAC system is detected and provides a first alert indicating detection of the first fault. In response to determining that the temperature rise value is greater than a predefined maximum threshold value, the controller determines that a second fault of the HVAC system is detected and provides a second alert indicating detection of the second fault.

In some cases, a fault of an HVAC system may result in inadequate and/or inefficient heating or cooling. Using previous technology, such faults are typically only identified after an occupant of a space conditioned by the HVAC system experiences discomfort and contacts a technician to service the HVAC system. As such, any brief or intermittent system operation issues or departure from designed operating parameters may go undetected using previous technology, such that necessary maintenance is not performed in a timely manner. This may result in increased damage to components of the HVAC system and increased downtimes for repair during which heating or cooling is not available to the conditioned space This disclosure not only encompasses the recognition of the problems of previous technology, including those described above, but provides technical solutions to these problems. As described further below, a controller of an HVAC system may be configured to determine temperature rise and/or temperature drop values using measured discharge air temperatures and return (or indoor) air temperatures to evaluate the performance and health of an HVAC system. For example, a temperature rise value may be determined for an HVAC system operating in a heating mode as a difference between the discharge air temperature and the return (or indoor) air temperature, and a temperature drop value may be determined as a difference between the return (or indoor) air temperature and the discharge air temperature for an HVAC system operating in a cooling mode. If the temperature rise and/or drop values are outside a predefined range (i.e., less than a predefined minimum value or greater than a predefined maximum value), the controller may detect that a fault has occurred. The controller may provide an alert indicating detection of the fault and a likely type of the fault (e.g., an indication of a likely cause of the fault, such as a component of the HVAC system that likely has failed).

If the temperature rise value for an HVAC system operating in a heating mode is less than a predefined minimum value (e.g., about 25° F. for a furnace that is under-firing and/or experiencing a high air flow rate, e.g., about 10° F. for a heat pump that is under-charged and/or experiencing a high air flow rate) or is greater than a predefined maximum value (e.g., about 75° F. for a furnace that is over-firing and/or experiencing airflow restrictions, e.g., about 50° F. for a heat pump that is over-charged, has a faulty outdoor expansion device, and/or is experiencing airflow restrictions), the controller may determine that the HVAC system is experiencing a fault. As another example, if the temperature drop for an HVAC system operating in a cooling mode is less than a predefined minimum value (e.g. 15° F. for loss of charge or a high air flow rate) or the discharge air temperature is less than a threshold value (e.g. 40° F. for an airflow restriction), the controller may determine that the HVAC system is experiencing a fault. As such, the system described in this disclosure may improve the technology used to efficiently operate HVAC systems. The controller described in this disclosure may particularly be implemented in an HVAC system for the practical application of detecting system faults proactively (e.g., before occupants experience significant discomfort) and alerting an occupant and/or maintenance provider of the fault, such that corrective actions may be taken with little or no impact to the occupants (i.e., with little or no downtime during which heating or cooling is not available).

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Figure 1:
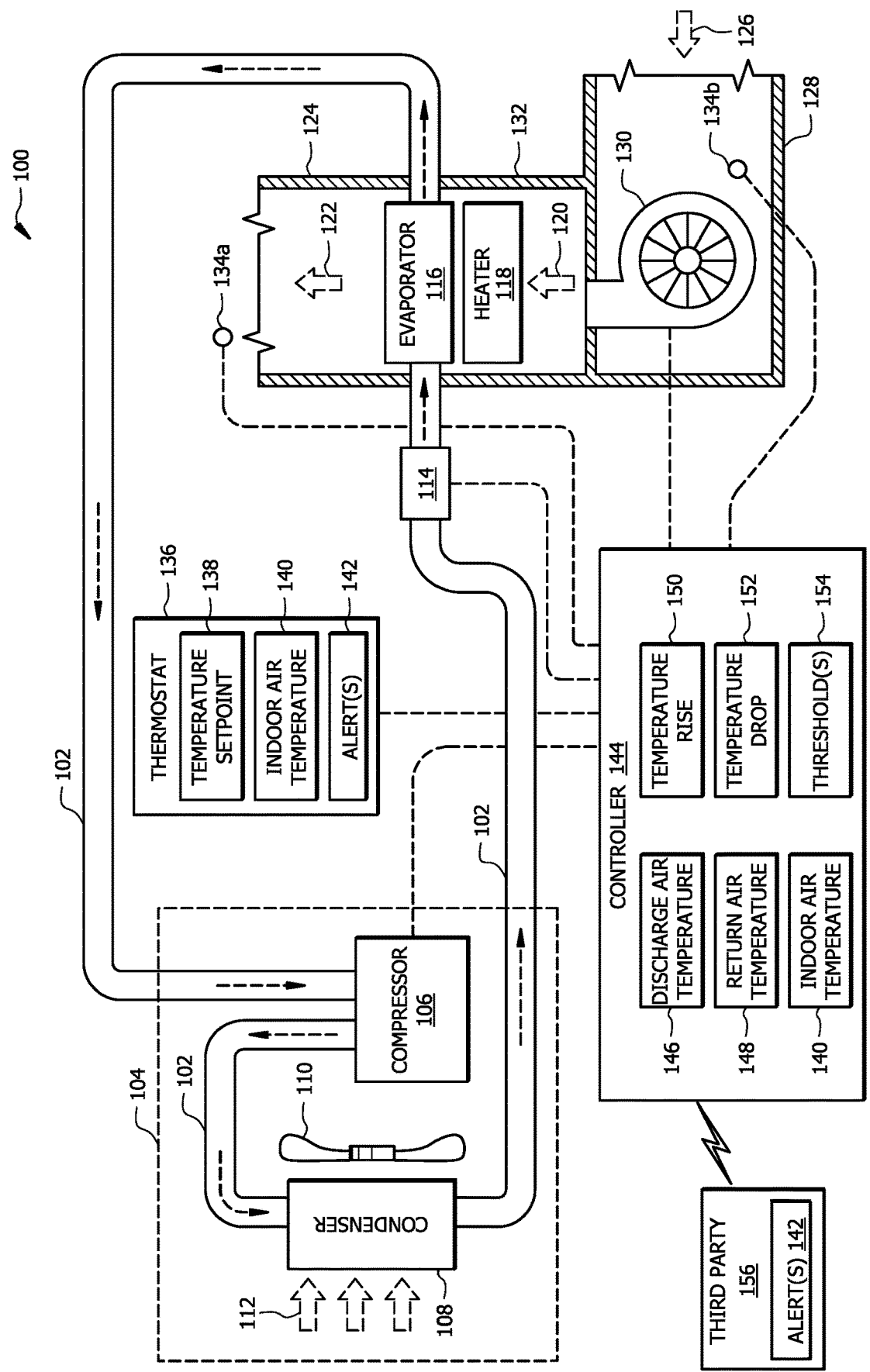
FIG. 1 is a diagram of an example HVAC system configured for fault detection.
Figure 2:
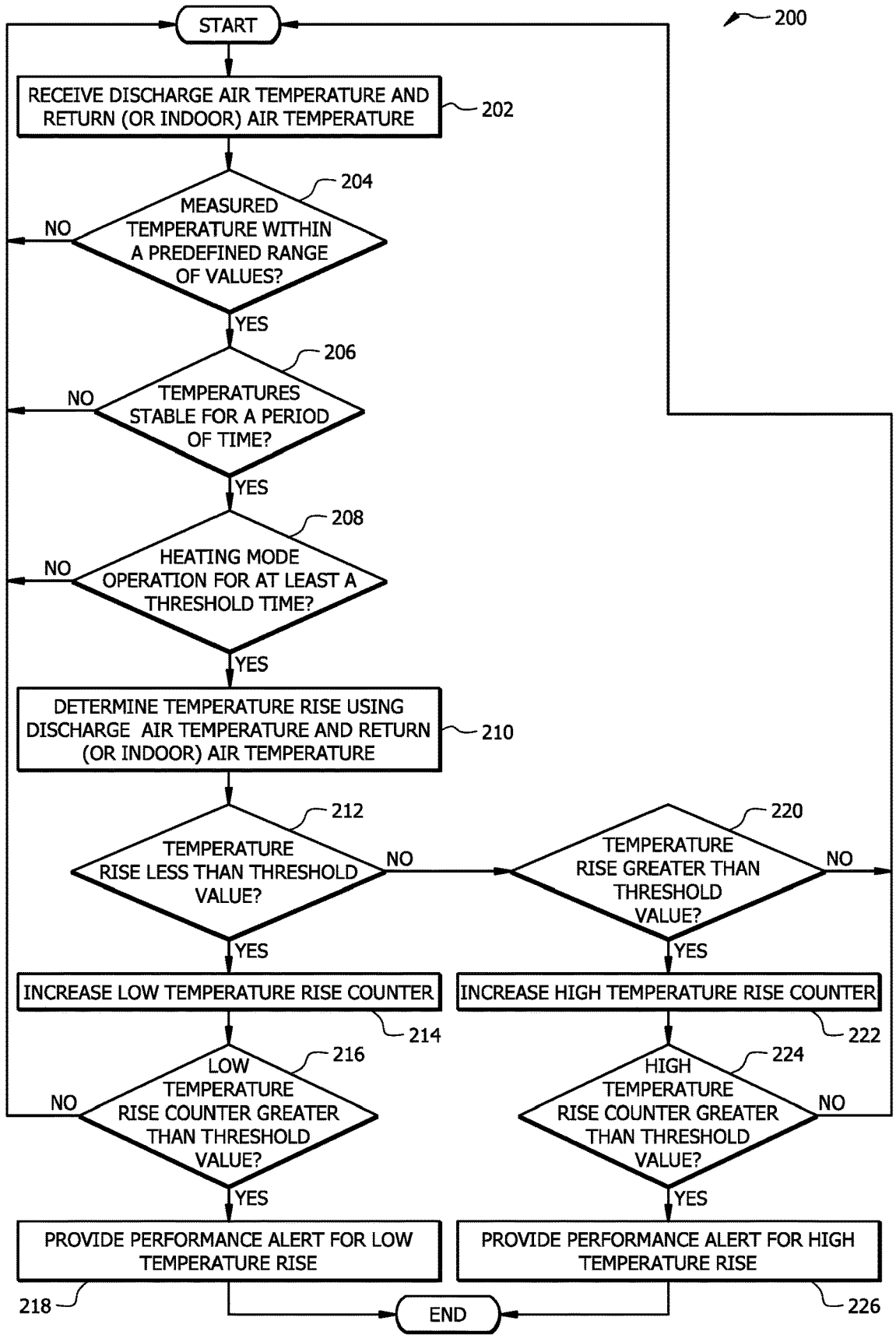
FIG. 2 is a flowchart of an example method of detecting a fault for the HVAC system of FIG. 1 operating in a heating mode.
Figure 3:
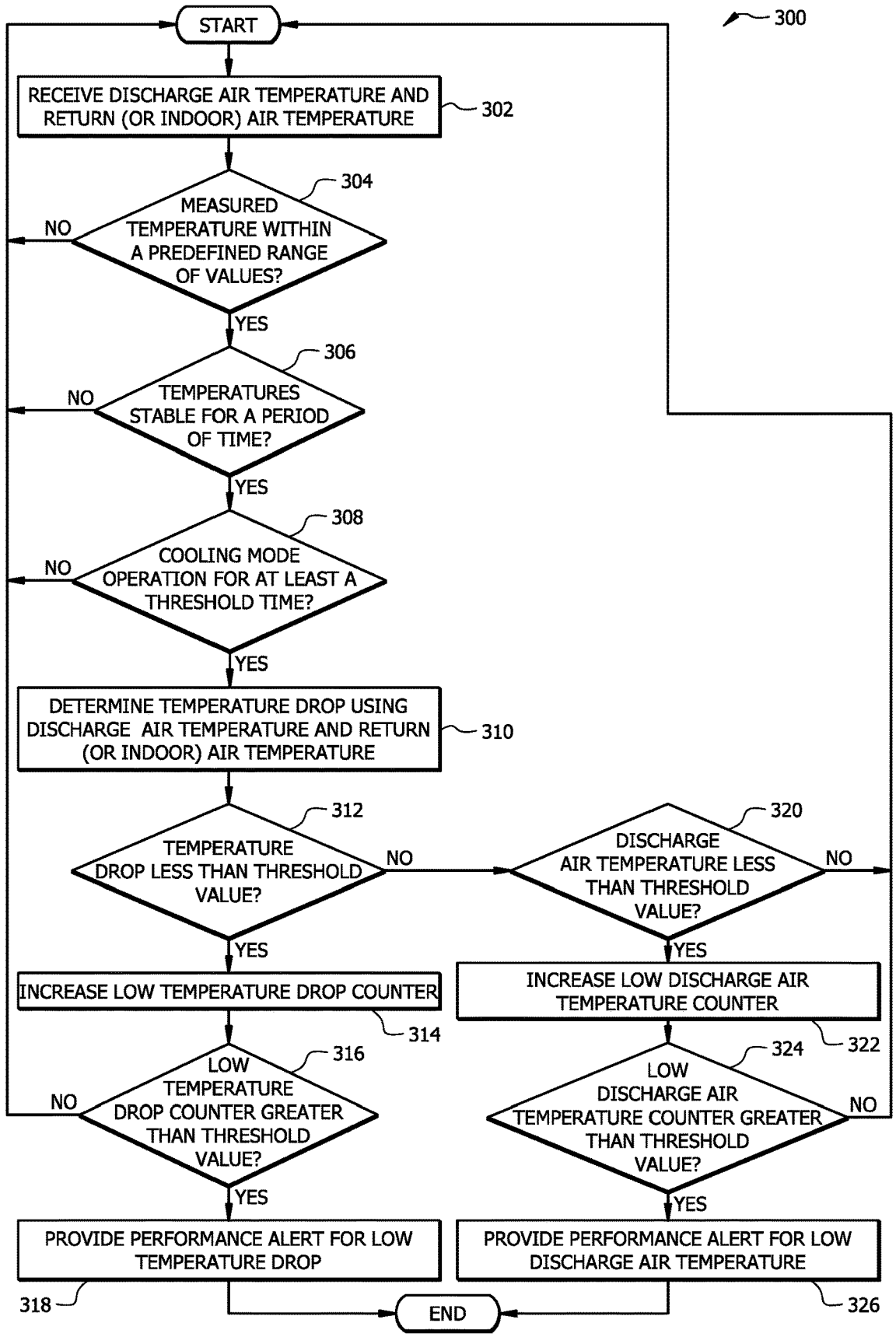
FIG. 3 is a flowchart of an example method of detecting a fault for the HVAC system of FIG. 1 operating in a cooling mode.
Figure 4:
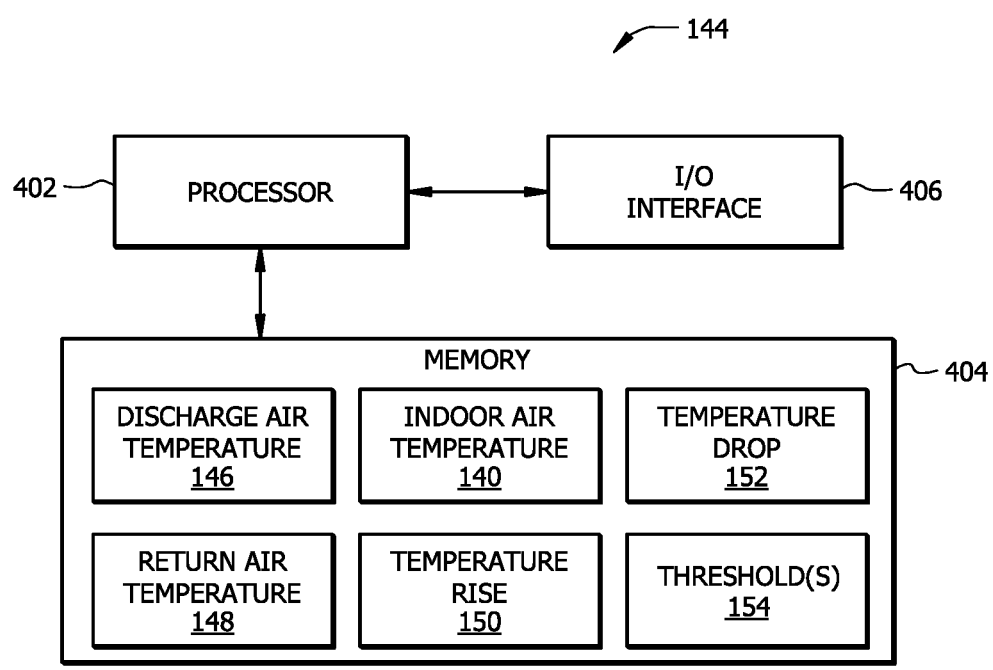
FIG. 4 is a diagram of an example controller of the HVAC system illustrated in FIG. 1.

As described above, prior to this disclosure, there was a lack of tools for reliably detecting HVAC system faults. The system described in this disclosure particularly facilitates the proactive detection of possible HVAC system faults, such that corrective action may be taken before the underlying source of the fault is exacerbated. For example, a loss of charge in the HVAC system may be detected before a component of the HVAC system is damaged. For instance, proactive detection of a fault may help in preventing the unwanted freezing of an evaporator coil of the HVAC system. The controller of the HVAC system described in this disclosure may further identify one or more likely causes of a detected fault, such that corrective action can be appropriately focused for timely correction. FIG. 1 illustrates an example HVAC system configured for the proactive detection and identification of system faults. FIGS. 2 and 3 illustrate methods for detecting faults and alerting appropriate parties of the faults for heating mode operation and cooling mode operation, respectively. FIG. 4 illustrates the controller of the HVAC system in greater detail.

HVAC System

FIG. 1 is a schematic diagram of an example HVAC system 100 configured to proactively detect system faults. The HVAC system 100 conditions air for delivery to a space. The space may be, for example, a room, a house, an office building, a warehouse, or the like. In some embodiments, the HVAC system 100 is a rooftop unit (RTU) that is positioned on the roof of a building and conditioned air 122 is delivered to the interior of the building. In other embodiments, portion(s) of the HVAC system 100 may be located within the building and portion(s) outside the building. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, at least one condensing unit 104, an expansion device 114, an evaporator 116, a heating element 118, a blower 130, sensors 134a,b, one or more thermostats 136, and a controller 144. The controller 144 of the HVAC system 100 is generally configured to detect possible faults of the HVAC system 100 using measurements of discharge air temperature 146, return air temperature 148, and/or indoor air temperature 140 and provide alerts 142 associated with the detected faults. In some cases, an alert 142 may be automatically provided to a third party 156 (e.g., a maintenance provider). This may facilitate proactive repairs of the HVAC system 100, such that there is limited or no downtime during which desired heating or cooling is not available.

The working-fluid conduit subsystem 102 facilitates the movement of a working fluid (e.g., a refrigerant) through a refrigeration cycle such that the working fluid flows as illustrated by the dashed arrows in FIG. 1. The working fluid may be any acceptable working fluid including, but not limited to, fluorocarbons (e.g. chlorofluorocarbons), ammonia, non-halogenated hydrocarbons (e.g. propane), hydrofluorocarbons (e.g. R-410A), or any other suitable type of refrigerant.

The condensing unit 104 includes a compressor 106, a condenser 108, and a fan 110. In some embodiments, the condensing unit 104 is an outdoor unit while other components of the HVAC system 100 may be located indoors. The compressor 106 is coupled to the working-fluid conduit subsystem 102 and compresses (i.e., increases the pressure of) the working fluid. The compressor 106 of condensing unit 104 may be a single-speed, variable-speed, or multiple stage compressor. A variable-speed compressor is generally configured to operate at different speeds to increase the pressure of the working fluid to keep the working fluid moving along the working-fluid conduit subsystem 102. In the variable-speed compressor configuration, the speed of compressor 106 can be modified to adjust the cooling capacity of the HVAC system 100. Meanwhile, in the multi-stage compressor configuration, one or more compressors can be turned on or off to adjust the cooling capacity of the HVAC system 100.

The compressor 106 is in signal communication with the controller 144 using wired and/or wireless connection. The controller 144 provides commands or signals to control operation of the compressor 106 and/or receives signals from the compressor 106 corresponding to a status of the compressor 106. For example, the controller 144 may transmit signals to adjust compressor speed. The controller 144 may operate the compressor 106 in different modes corresponding, for example, to a user requested mode (e.g., a heating or cooling mode), to load conditions (e.g., the amount of cooling or heating required by the HVAC system 100), to a difference between a setpoint temperature 138 and an indoor air temperature 140, and the like.

The condenser 108 is generally located downstream of the compressor 106 and is configured, when the HVAC system 100 is operating in a cooling mode, to remove heat from the working fluid. The fan 110 is configured to move air 112 across the condenser 108. For example, the fan 110 may be configured to blow outside air through the condenser 108 to help cool the working fluid flowing therethrough. In the cooling mode, the compressed, cooled working fluid flows from the condenser 108 toward the expansion device 114.

The expansion device 114 is coupled to the working-fluid conduit subsystem 102 downstream of the condenser 108 and is configured to remove pressure from the working fluid. In this way, the working fluid is delivered to the evaporator 116 and receives heat from airflow 120 to produce a conditioned airflow 122 that is delivered by a duct subsystem 124 to the conditioned space. In general, the expansion device 114 may be a valve such as an expansion valve or a flow control valve (e.g., a thermostatic expansion valve) or any other suitable valve for removing pressure from the working fluid while, optionally, providing control of the rate of flow of the working fluid. The expansion device 114 may be in communication with the controller 144 (e.g., via wired and/or wireless communication) to receive control signals for opening and/or closing associated valves and/or provide flow measurement signals corresponding to the rate of working fluid through the working-fluid conduit subsystem 102.

The evaporator 116 is generally any heat exchanger configured to provide heat transfer between air flowing through (or across) the evaporator 116 (i.e., air contacting an outer surface of one or more coils of the evaporator 116) and working fluid passing through the interior of the evaporator 116, when the HVAC system 100 is operated in the cooling mode. The evaporator 116 may include one or more circuits. The evaporator 116 is fluidically connected to the compressor 106, such that working fluid generally flows from the evaporator 116 to the condensing unit 104. A portion of the HVAC system 100 is configured to move air 120 across the evaporator 116 and out of the duct subsystem 124 as conditioned air 122.

The heating element 118 is generally any device for heating the flow of air 120 and providing heated air 122 to the conditioned space, when the HVAC system 100 operates in a heating mode. For example, the heating element 118 may be an electrical heater (e.g., comprising one or more resistive elements) or a component of a furnace of the HVAC system 100. In some embodiments, the HVAC system 100 is configured to operate as a heat pump. Generally, when the HVAC system is operating as a heat pump in a heating mode, the flow of refrigerant is reversed, such that the condenser 108 acts an evaporator and the evaporator 116 acts as a condenser to heat the flow of air 120 passing therethrough. If the HVAC system 100 is configured to operate as a heat pump, the HVAC system 100 may include a reversing valve to reverse the flow of working fluid through the HVAC system 100 during operation in the heating mode and an outdoor expansion device for expanding the working fluid provided to the condenser 108, which acts an evaporator in the heating mode. When the HVAC system 100 is configured to operate as a heat pump, the heating element 118 may provide supplemental and/or backup heating to the flow of air 120. The heating element 118 may be in communication with the controller 144 (e.g., via wired and/or wireless communication) to receive control signals for activating the heating element 118 to heat the flow of air 120, when the HVAC system 100 is operated in a heating mode. Generally, when the HVAC system 100 is operated in a heating mode, the heating element 118 and blower 130 are turned on such that the flow of air 120 is provided across and heated by the heating element 118. When the HVAC system 100 is operated in a cooling mode, the heating element 118 is generally turned off (i.e., such that the flow of air 120 is not heated).

Return air 126, which may be air returning from the building, air from outside, or some combination, is pulled into a return duct 128. An inlet or suction side of the blower 130 pulls the return air 126. The blower 130 discharges air 120 into a duct 132 such that air 120 crosses the evaporator 116 and/or heating element 118 to produce conditioned air 122. The blower 130 is any mechanism for providing a flow of air through the HVAC system 100. For example, the blower 130 may be a constant-speed or variable-speed circulation blower or fan. Examples of a variable-speed blower include, but are not limited to, belt-drive blowers controlled by inverters, direct-drive blowers with electronic commuted motors (ECM), or any other suitable type of blower. The blower 130 is in signal communication with the controller 144 using any suitable type of wired and/or wireless connection. The controller 144 is configured to provide commands and/or signals to the blower 130 to control its operation.

The HVAC system 100 includes sensors 134a,b in signal communication with controller 144. Sensor 134a is positioned and configured to measure a discharge air temperature 146 (e.g., a temperature of airflow 122). Sensor 134b is positioned and configured to measure a return air temperature 148 (e.g., of airflow 126). Signals corresponding to the properties measured by sensors 134a,b may be provided to the controller 144. In other examples, the HVAC system 100 may include other sensors (not shown for clarity and conciseness) positioned and configured to measure any other property associated with operation of the HVAC system 100 (e.g., the temperature and/or relative humidity of air at one or more locations within the conditioned space and/or outdoors). In some embodiments, one or more of the sensors 134a,b or another sensor integrated with the HVAC system 100 may be an internet-of-things (IOT) device. For example, one or more of the sensors 134a,b may communicate wirelessly with the controller 144 (e.g., via a wireless network associated with the conditioned space).

The HVAC system 100 includes one or more thermostats 136, for example, located within the conditioned space (e.g. a room or building). The thermostat(s) 136 are generally in signal communication with the controller 144 using any suitable type of wired and/or wireless connection. In some embodiments, one or more functions of the controller 144 may be performed by the thermostat(s) 136. For example, the thermostat 136 may include the controller 144. The thermostat(s) 136 may include one or more single-stage thermostats, one or more multi-stage thermostat, or any suitable type of thermostat(s). The thermostat(s) 136 are configured to allow a user to input a desired temperature or temperature setpoint 138 for the conditioned space and/or for a designated space or zone, such as a room, in the conditioned space. The thermostat(s) generally include or are in communication with a sensor for measuring an indoor air temperature 140. The indoor air temperature 140 may be a temperature of air in the conditioned space and/or in a designated space or zone of the conditioned space, such as a room in which the thermostat or an indoor air sensor associated with the thermostat 136 is installed.

The controller 144 may use information from the thermostat 136 such as the temperature setpoint 138 and indoor air temperature 140 for controlling the compressor 106, the blower 130, and the fan 110 (e.g., for operation in a cooling mode) and/or of the heating element 118 and blower 130 (e.g., for operation in a heating mode). In some embodiments, a thermostat 136 includes a user interface and/or display for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for display of an alert 142 associated with any proactively detected fault of the HVAC system 100 along any other messages related to the status and/or operation of the HVAC system 100.

As described in greater detail below, the controller 144 is configured to monitor the discharge air temperature 146 measured by the discharge air temperature sensor 134a and the return air temperature 148 measured by the return air temperature sensor 134b. The controller 144 is described in greater detail below with respect to FIG. 4. To detect a possible fault during operation in a heating mode, the controller 144 uses the monitored discharge air temperature 146 and return air temperature 148 to determine a temperature rise value 150. The temperature rise value 150 may be determined as the difference between the discharge air temperature 146 and return air temperature 148. As described in greater detail with respect to FIG. 2 below, if the temperature rise value 150 is outside a range established by predefined threshold values 154, a fault may be detected. For instance, if the temperature rise value 150 is less than a predefined minimum threshold of thresholds 154, the controller 144 may determine that a furnace is under-firing, the HVAC system 100 is under-charged with working fluid (e.g., when the HVAC system 100 is configured to operate as a heat pump), and/or a rate of airflow 120 across the heating element 118 is too high and a corresponding alert 142 may be presented on the interface of the thermostat 136 and/or provided to the third party 156. If the temperature rise value 150 is greater than a predefined maximum value threshold of thresholds 154, the controller 144 may determine that a furnace is over-firing, the HVAC system 100 is over-charged with working fluid (e.g., when the HVAC system 100 is configured to operate as a heat pump), and/or a rate of airflow 120 across the heating element 118 is too low and a corresponding alert 142 may be presented on the interface of the thermostat 136 and/or provided to the third party 156. The values of the minimum and maximum thresholds 154 may be different based on the type of heating element 118 employed by the HVAC system 100. The proactive provision of alerts 142 may facilitate timely correction of any detected fault(s). The detection of faults associated with operating the HVAC system 100 in a heating mode is described in greater detail below with respect to FIG. 2.

To detect a possible fault during operation in a cooling mode, the controller 144 uses the monitored discharge air temperature 146 and return air temperature 148 to determine a temperature drop value 152. The temperature drop value 152 may be determined as the difference between the return air temperature 148 and the discharge air temperature 146. As described in greater detail with respect to FIG. 3 below, if the temperature drop value 152 is less than a predefined minimum threshold of thresholds 154, the controller 144 may determine that there is a loss of charge in the HVAC system 100 and/or an excessively high flow rate of airflow 120 across the evaporator 116 and a corresponding alert 142 may be presented on the interface of the thermostat 136 and/or provided to the third party 156. If the discharge air temperature 146 is less than a predefined threshold of thresholds 154, the controller 144 may determine that the rate of airflow 120 is insufficient and a corresponding alert 142 may be presented on the interface of the thermostat 136 and/or provided to the third party 156. The detection of faults associated with operating the HVAC system 100 in a cooling mode is described in greater detail below with respect to FIG. 3.

In some embodiments, an indoor air temperature 140 measured by the thermostat 136 is used in place of the return air temperature 148. For example, in some cases, an HVAC system 100 may not include a return air temperature sensor 134b or the return air temperature sensor 134b may malfunction (e.g., a return air temperature 148 may not be within a predefined range of values, as described below with respect to steps 204, 304 of FIGS. 2 and 3). In such cases, the indoor air temperature 140 may be used in place of the return air temperature 148 in order to determine the temperature rise value 150 and/or temperature drop value 152.

As described above, in certain embodiments, connections between various components of the HVAC system 100 are wired. For example, conventional cable and contacts may be used to couple the controller 144 to the various components of the HVAC system 100, including, the compressor 106, the fan 110, the expansion device 114, heating element 118, sensors 134a,b, blower 130, and thermostat(s) 136. In some embodiments, a wireless connection is employed to provide at least some of the connections between components of the HVAC system 100. In some embodiments, a data bus couples various components of the HVAC system 100 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 144 to other components of the HVAC system 100.

In an example operation of HVAC system 100, the HVAC system 100 starts up to operate in a heating mode. For example, in response to the indoor temperature 140 falling below the temperature setpoint 138 while the HVAC system 100 is set to operate in a heating mode, the controller 144 may cause the heating element 118 and the blower 130 to turn on to start up the HVAC system 100 in the heating mode. During operation of the HVAC system 100 in the heating mode, the controller 144 receives measurements of the discharge air temperature 146 and the return air temperature 148. These temperatures 146, 148 are used to determine a temperature rise value 150. The temperature rise value 150 may be determined as:

$$\text{Temperature rise value} = DAT - RAT(\text{or } IAT)$$

where DAT is the discharge air temperature 146, RAT is the return air temperature 148, and IAT is the indoor air temperature 140.

Before making a determination of whether the temperature rise value 150 is indicative of a fault, the controller 144 may first determine that the HVAC system 100 has been operating in the heating mode for a minimum period of time (e.g., for at least ten minutes). This may ensure that the discharge air temperature 146 and return air temperature 148 are reliable indicators of the performance of the HVAC system 100 in the heating mode. In some embodiments, the controller 144 may also or alternatively determine, as a prerequisite to detecting any system fault, that the discharge air temperature 146 and/or the return air temperature 148 have been stable (i.e., has not changed greater than a threshold amount) for a predetermined amount of time (e.g., for at least ten minutes).

If the temperature rise value 150 is less than a minimum threshold value of the thresholds 154 (e.g., of about 25° F. for a furnace heating element 118 or of about 10° F. for when the HVAC system operates as a heat pump), then the HVAC system 100 may be experiencing a high rate of airflow 120, a furnace heating element 118 may be under-firing, and/or the HVAC system 100 when operating as a heat pump in a heating mode may be under-charged with working fluid. In some embodiments in which the heating element 118 is a component of a furnace of the HVAC system 100, the minimum threshold value of thresholds 154 is determined based on one or both of the firing rate of the furnace and the rate of the flow of air 120 across the furnace heating element 118. For example, the minimum threshold value 154 for the temperature rise value 150 may be increased at increased firing rates and/or decreased rates of the flow of air 120. In embodiments where heating is provided by operating the HVAC system 100 as a heat pump in the heating mode and the compressor 106 is a variable speed compressor, the minimum threshold value 154 may be based on the speed of the compressor. Prior to reporting a detected fault, the controller 144 may determine whether the above conditions have been satisfied for a threshold number of times (e.g., of three or more times). If the temperature rise value 150 is found to be less than the threshold value 154 for the threshold number of times, an alert 142 may be presented on the interface of the thermostat 136 and/or provided to the third party 156. The alert 142 may indicate the suspected high rate of airflow 120, under-firing of the furnace heating element 118, and/or under-charging of the HVAC system 100 operating as a heat pump in the heating mode associated with the temperature rise value 150 being less than the threshold value 154.

If the temperature rise value 150 is greater than a maximum threshold value of thresholds 154 (e.g., of about 75° F. for a furnace heating element 118 or of about 50° F. when the HVAC system 100 is configured to operate as a heat pump in the heating mode), then the HVAC system 100 may be experiencing a low rate of airflow 120, a furnace heating element 118 may be over-firing, and/or an HVAC system 100 operating as a heat pump in the heating mode may be over-charged with working fluid. In some embodiments in which the heating element 118 is a component of a furnace of the HVAC system 100, the maximum threshold value of thresholds 154 is determined based on one or both of the firing rate of the furnace and the rate of the flow of air 120 across the furnace heating element 118. For example, the maximum threshold value for the temperature rise value 150 may be increased at increased firing rates and/or decreased rates of the flow of air 120. In embodiments where heating is provided by operating the HVAC system 100 as a heat pump in the heating mode and the compressor 106 is a variable speed or multi-stage compressor, the maximum threshold value 154 may be based on the speed of the compressor. Prior to reporting a detected fault, the controller 144 may determine whether the above conditions have been satisfied for a threshold number of times (e.g., of three or more times). If the temperature rise value 150 is found to be greater than the threshold value 154 for the threshold number of times, an alert 142 may be presented on the interface of the thermostat 136 and/or provided to the third party 156. The alert 142 may indicate the suspected low rate of airflow 120, over-firing of the furnace heating element 118, and/or over-charging of the HVAC system 100 operating as a heat pump in the heating mode associated with the temperature rise value 150 being greater than the threshold value 154.

In another example operation of the HVAC system 100, the HVAC system 100 starts up to operate in a cooling mode. For example, in response to the indoor temperature 140 exceeding the temperature setpoint 138 while the HVAC system 100 is set to operate in a cooling mode, the controller 144 may cause the compressor 106, fan 110, and blower 130 to turn on to start up the HVAC system 100 in the cooling mode. During operation of the HVAC system 100 in the cooling mode, the controller 144 receives measurements of the discharge air temperature 146 and the return air temperature 148. These temperatures 146, 148 are used to determine a temperature drop value 152. The temperature drop value 152 may be determined as:

$$\text{Temperature drop value} = RAT(\text{or } IAT) - DAT$$

where DAT is the discharge air temperature 146, RAT is the return air temperature 148, and IAT is the indoor air temperature 140.

Before making a determination of whether the temperature drop value 152 is indicative of a fault, the controller 144 may first determine that the HVAC system 100 has been operating in the cooling mode for a minimum period of time (e.g., for at least ten minutes). This may ensure that the discharge air temperature 146 and return air temperature 148 are reliable indicators of the performance of the HVAC system 100 in the cooling mode. In some embodiments, the controller 144 may also or alternatively determine, as a prerequisite to detecting any system fault, that the discharge air temperature 146 and/or the return air temperature 148 has been stable (i.e., has not changed greater than a threshold amount) for a predetermined amount of time (e.g., for at least ten minutes).

If the temperature drop value 152 is less than a minimum threshold value of the thresholds 154 (e.g., of about 15° F.), then the evaporator 116 may be experiencing a high rate of airflow 120, the expansion device 114 may be stuck in an open position, and/or the HVAC system 100 may be under-charged with working fluid. In some embodiments (e.g., in which the compressor 106 is a variable speed or multi-stage compressor), the minimum threshold value of thresholds 154 is determined based on the speed of the compressor 106. Prior to reporting a detected fault, the controller 144 may determine whether the above conditions have been satisfied for a threshold number of times (e.g., of three or more times). If the temperature drop value 152 is found to be less than the threshold value 154 for the threshold number of times, an alert 142 may be presented on the interface of the thermostat 136 and/or provided to the third party 156. The alert 142 may indicate the suspected high rate of airflow 120, the stuck expansion device 114, and/or the under-charging of the HVAC system 100 associated with the temperature drop value 150 being less than the threshold value 154.

If the discharge air temperature 146 is less than a predefined threshold value of thresholds 154 (e.g., of about 40° F.), then the evaporator 116 may be experiencing a low rate of airflow 120 and/or the expansion device 114 may be stuck in a closed position. Prior to reporting a detected fault, the controller 144 may determine whether the above conditions have been satisfied for a threshold number of times (e.g., of three or more times). If the discharge air temperature 146 is found to be less than the threshold value 154 for the threshold number of times, an alert 142 may be presented on the interface of the thermostat 136 and/or provided to the third party 156. The alert 142 may indicate the suspected low rate of airflow 120 and/or the stuck expansion device 114 associated with the discharge air temperature 146 being less than the threshold value 154.

Example Methods of HVAC System Prognostics and Diagnostics

FIGS. 2 and 3 illustrate methods 200 and 300 of detecting and providing appropriate alerts 142 for faults of the HVAC system when the HVAC system 100 is operating in the heating mode and cooling mode, respectively. The controller 144 is configured to execute method 200 of FIG. 2 when the HVAC system 100 is operating in the heating mode (i.e., when there is a call for heating, such as when the indoor air temperature 140 is less than the setpoint temperature 138) and to execute method 300 of FIG. 3 when the HVAC system 100 is operating in the cooling mode (i.e., when there is a call for cooling, such as when the indoor air temperature 140 is greater than the setpoint temperature 138).

Method 200 may begin at step 202 where the controller 144 receives measurements of the discharge air temperature 146 and return air temperature 148. As described above, in some cases, the controller 144 may use the indoor air temperature 140 in place of the return air temperature 148 (e.g., when a measure or return air temperature 148 is not available or is determined to be unreliable).

At step 204, the controller 144 determines whether received temperatures 146, 148 are within a predefined range of values (e.g., a range established by thresholds 154 of FIGS. 1 and 4). For example, the controller 144 may determine whether the discharge air temperature 146 and the return air temperature 148 are within a corresponding predefined range of temperatures (e.g., between about 30° F. and about 140° F.). Generally, if the temperatures 146, 148 are not within the predefined range, the corresponding temperature sensors 134a, 134b are likely malfunctioning. If the return air temperature 148 is not within the predefined range of values or the return air temperature 148 is otherwise unavailable (e.g., because the return air temperature sensor 134b is not operating or is not present in the HVAC system 100), the controller 144 may use the indoor air temperature 140 in its place. While the subsequent steps of method 200 are described with respect to using the return air temperature 148 to determine temperature rise values 150, it should be understood that the return air temperature 148 may be substituted with the indoor air temperature 140. If the temperatures 146, 148 are within the predefined range of values, the controller 144 proceeds to step 206. Otherwise, the controller 144 may restart the method 200.

At step 206, the controller 144 may determine whether the discharge air temperature 146 and return air temperature 148 have been stable for a predefined period of time. For example, the controller 144 may determine whether the temperatures 146, 148 have changed by greater than a threshold amount 154 (e.g., of about 1° F.) within a predefined time period (e.g., of about ten minutes). If the temperatures 146, 148 have changed by greater than the threshold amount 154 within the predefined time period, the temperatures 146, 148 are determined to not be stable, and the controller 144 returns to the start of method 200. Otherwise, if the controller 144 determines that the temperatures 146, 148 have not changed by greater than the threshold amount 154 within the predefined time period, the controller 144 determines the temperatures 146, 148 are stable and proceeds to step 208.

At step 208, the controller 144 determines whether the HVAC system 100 has been operating in the heating mode for at least a predefined amount of time (e.g., of about ten minutes). If the HVAC system 100 has been operating in the heating mode for at least the predefined amount of time, the controller 144 proceeds to step 210. Otherwise, if the HVAC system 100 has not been operating in the heating mode for at least the predefined amount of time, the controller 144 returns to the start of method 200.

At step 210, the controller 144 determines the temperature rise value 150. The temperature rise value 150 generally corresponds to a measure of the extent to which the space is being heated by the HVAC system 100 during operation in the heating mode. The temperature rise value 150 is determined based on the discharge air temperature 146 and the return air temperature 148 (or the indoor air temperature 140 in some cases, as described above with respect to step 204). As an example, the temperature rise value 150 may be determined as the difference between the discharge air temperature 146 and the return air temperature 148 (or the difference between the discharge air temperature 146 and the indoor air temperature 140).

At step 212, the controller determines whether the temperature rise value 150 is less than a predefined minimum threshold value 154. The predefined minimum threshold value 154 may be specific to the type of heating element 118 employed by the HVAC system 100. For example, the predefined minimum threshold value 154 may be about 25° F. for a furnace heating element 118, and the predefined minimum threshold value 154 may be about 10° F. for when the HVAC system 100 is operating as a heat pump in the heating mode (i.e., with the flow of refrigerant reversed such the condenser 108 acts an evaporator and the evaporator 116 acts a condenser). If the temperature rise value 150 is less than the predefined minimum threshold value 154, then the controller 144 proceeds to step 214. Otherwise, if the temperature rise value 150 is not less than the predefined minimum threshold value 154, then the controller 144 proceeds to step 220.

At step 214 (i.e., for cases where the temperature rise value 150 is less than the predefined minimum threshold value 154 at step 212), the controller 144 may increase a count of detected low temperature rise values 150. At step 216, the controller 144 determines whether this count of detected low temperature rise values 150 is greater than a threshold (e.g., greater three). If the count is greater than the threshold, the controller 144 proceeds to step 218 and provides an alert 142 of the detected low temperature rise value 150. The alert 142 of the low temperature rise value 150 may include an indication of one or more faults associated with the low temperature rise value 150. For example, the alert 142 may include an indication of a possible high rate of the airflow 120 across the heating element 118 (e.g., an indication that the rate of airflow 120 is greater than a threshold value 154). If the heating element 118 is a furnace, the alert 142 may indicate the possible under-firing of the furnace. If the HVAC system 100 is operating as a heat pump in the heating mode, the alert 142 may include an indication of a possible under-charging of working fluid in the HVAC system 100 (e.g., a loss of working fluid from one or more components of the HVAC system 100). If, at step 216, the count is not greater than the threshold, the controller 144 may return to the start of method 200. By requiring the count to be greater than a threshold value, false positive fault detections may be eliminated or reduced in some cases.

At step 220 (i.e., for cases where the temperature rise value 150 is not less than the predefined minimum threshold value 154 at step 212), the controller 144 determines whether the temperature rise value 150 is greater than a predefined maximum threshold value 154. The predefined maximum threshold value 154 may be specific to the type of heating element 118 employed by the HVAC system 100. For example, the predefined maximum threshold value 154 may be about 75° F. for a furnace heating element 118, and the predefined maximum threshold value 154 may be about 50° F. for when the HVAC system 100 is operating as a heat pump in the heating mode. If the temperature rise value 150 is greater than the predefined maximum threshold value 154, then the controller 144 proceeds to step 222. Otherwise, if the temperature rise value 150 is not greater than the predefined maximum threshold value 154, then the controller 144 may return to the start of method 200 to continue checking for possible system faults.

At step 222, the controller 144 may increase a count of detected high temperature rise values 150. At step 224, the controller 144 determines whether this count of detected high temperature rise values 150 is greater than a threshold (e.g., greater than three). If the count is greater than the threshold, the controller 144 proceeds to step 226 and provides an alert 142 of the detected high temperature rise value 150. The alert 142 of the high temperature rise value 150 may include an indication of one or more faults associated with the high temperature rise value 150. For example, the alert 142 may include an indication of a possible low rate of the airflow 120 across the heating element 118 (e.g., an indication that the rate of airflow 120 is lower than a threshold value 154). If the heating element 118 is component of a furnace, the alert 142 may indicate the possible over-firing of the furnace. If the HVAC system 100 is operating as a heat pump in the heating mode, the alert 142 may include an indication of a possible over-charging of working fluid in the HVAC system 100 and/or an indication that an outdoor expansion device (e.g., similar to expansion device 114 of FIG. 1) is stuck in a closed position. If, at step 224, the count is not greater than the threshold, the controller 144 may return to the start of method 200. As described above with respect to step 216, requiring, in some embodiments, the count to be greater than a threshold value my reduce or eliminate false positive fault detections.

Modifications, additions, or omissions may be made to method 200 depicted in FIG. 2. Method 200 may include more, fewer, or other steps. For example, steps may be performed in parallel or in any suitable order. While at times discussed as controller 144, HVAC system 100, or components thereof performing the steps, any suitable HVAC system or components of the HVAC system may perform one or more steps of the method 200.

As described above, the controller 144 generally executes the method 300 of FIG. 3 when the HVAC system is operating in a cooling mode. Method 300 may begin at step 302 where the controller 144 receives measurements of the discharge air temperature 146 and return air temperature 148. As described above, in some cases, the controller 144 may use the indoor air temperature 140 in place of the return air temperature 148 (e.g., when a measure or return air temperature 148 is not available or is determined to be unreliable).

At step 304, the controller 144 determines whether the received temperatures 146, 148 are within a predefined range of values (e.g., a range established by thresholds 154 of FIGS. 1 and 4). For example, the controller 144 may determine whether the discharge air temperature 146 and the return air temperature 148 are within a corresponding predefined range of temperatures (e.g., between about 30° F. and about 140° F.). Generally, if the temperatures 146, 148 are not within the predefined range, the corresponding temperature sensors 134a, 134b are likely malfunctioning. If the return air temperature 148 is not within the predefined range of values or the return air temperature 148 is otherwise unavailable (e.g., because the return air temperature sensor 134b is not operating or is not present in the HVAC system 100), the controller 144 may use the indoor air temperature 140 in its place. While the subsequent steps of method 300 are described with respect to using the return air temperature 148 to determine temperature drop values 152, it should be understood that the return air temperature 148 may be substituted with the indoor air temperature 140. If the temperatures 146, 148 are within the predefined range of values, the controller 144 proceeds to step 306. Otherwise, the controller 144 may restart the method 300.

At step 306, the controller 144 may determine whether the discharge air temperature 146 and return air temperature 148 have been stable for a predefined period of time. For example, the controller 144 may determine whether the temperatures 146, 148 have changed by greater than a threshold amount 154 (e.g., of about 1° F.) within a predefined time period (e.g., of about ten minutes). If the temperatures 146, 148 have changed by greater than the threshold amount 154 within the predefined time period, the temperatures 146, 148 are determined to not be stable, and the controller 144 returns to the start of method 300. Otherwise, if the controller 144 determines that the temperatures 146, 148 have not changed by greater than the threshold amount 154 within the predefined time period, the controller 144 determines the temperatures 146, 148 are stable and proceeds to step 308.

At step 308, the controller 144 determines whether the HVAC system 100 has been operating in the cooling mode for at least a predefined amount of time (e.g., of about ten minutes). If the HVAC system 100 has been operating in the cooling mode for at least the predefined amount of time, the controller 144 proceeds to step 310. Otherwise, if the HVAC system 100 has not been operating in the cooling mode for at least the predefined amount of time, the controller 144 returns to the start of method 300.

At step 310, the controller 144 determines the temperature drop value 152. The temperature drop value 152 generally corresponds to a measure of the extent to which the space is being cooled by the HVAC system 100 during operation in the cooling mode. The temperature drop value 152 is determined based on the discharge air temperature 146 and the return air temperature 148 (or the indoor air temperature 140 in some cases, as described above with respect to step 304). As an example, the temperature drop value 152 may be determined as the difference between the return air temperature 148 and the discharge air temperature 146 (or the difference between the indoor air temperature 140 and the discharge air temperature 146).

At step 312, the controller determines whether the temperature drop value 152 is less than a predefined minimum threshold value 154. For example, the predefined minimum threshold value 154 may be about 15° F. In some embodiments (e.g., in which the compressor 106 is a variable speed or multi-stage compressor), the minimum threshold value 154 is determined based on the speed of the compressor 106. If the temperature drop value 152 is less than the predefined minimum threshold value 154, then the controller 144 proceeds to step 314. Otherwise, if the temperature drop value 152 is not less than the predefined minimum threshold value 154, then the controller 144 proceeds to step 320.

At step 314 (i.e., for cases where the temperature drop value 152 is less than the predefined minimum threshold value 154 at step 312), the controller 144 may increase a count of detected low temperature drop values 152. At step 316, the controller 144 determines whether this count of detected low temperature drop values 152 is greater than a threshold (e.g., greater than three). If the count is greater than the threshold, the controller 144 proceeds to step 318 and provides an alert 142 of the detected low temperature drop value 152. The alert 142 of the low temperature drop value 152 may include an indication of one or more faults associated with the low temperature drop value 152. For example, the alert 142 may include an indication of a possible high rate of the airflow 120 across the evaporator 116 (e.g., an indication that the rate of airflow 120 is greater than a threshold value 154), an indication of possible undercharging of the HVAC system 100 with working fluid (e.g., a loss of working fluid from one or more components of the HVAC system 100), and/or an indication that the expansion device 114 may be stuck in an open position. If, at step 316, the count is not greater than the threshold, the controller 144 may return to the start of method 300. By requiring the count to be greater than a threshold value, false positive fault detections may be eliminated or reduced in some cases.

At step 320 (i.e., for cases where the temperature drop value 152 is not less than the predefined minimum threshold value 154 at step 312), the controller 144 determines whether the discharge air temperature 146 is less than a predefined threshold value 154. The predefined threshold value 154 may be about 40° F. If the discharge air temperature 146 is less than the predefined threshold value 154, then the controller 144 proceeds to step 322. Otherwise, if the discharge air temperature 146 is not less than the predefined threshold value 154, then the controller 144 may return to the start of method 300 to continue checking for possible system faults.

At step 322, the controller 144 may increase a count of detected low discharge air temperature 146. At step 324, the controller 144 determines whether this count of detected low discharge air temperature 146 is greater than a threshold (e.g., greater than three). If the count is greater than the threshold, the controller 144 proceeds to step 326 and provides an alert 142 of the detected low discharge air temperature 146. The alert 142 of the low discharge air temperature 146 may include an indication of one or more faults associated with the low discharge air temperature 146. For example, the alert 142 may include an indication of a possible low rate of the airflow 120 across the evaporator 116 (e.g., an indication that the rate of airflow 120 is lower than a threshold value 154) and/or an indication that the expansion device 114 is possibly stuck in a closed position. If, at step 324, the count is not greater than the threshold, the controller 144 may return to the start of method 300. As described above with respect to step 316, requiring, in some embodiments, the count to be greater than a threshold value may reduce or eliminate false positive fault detections.

Modifications, additions, or omissions may be made to method 300 depicted in FIG. 3. Method 300 may include more, fewer, or other steps. For example, steps may be performed in parallel or in any suitable order. While at times discussed as controller 144, HVAC system 100, or components thereof performing the steps, any suitable HVAC system or components of the HVAC system may perform one or more steps of the method 300.

Example Controller

FIG. 4 is a schematic diagram of an embodiment of the controller 144. The controller 144 includes a processor 402, a memory 404, and an input/output (I/O) interface 406.

The processor 402 includes one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 404 and controls the operation of HVAC system 100. The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory 404 and executes them by directing the coordinated operations of the ALU, registers, and other components. The processor 402 may include other hardware and software that operates to process information, control the HVAC system 100, and perform any of the functions described herein (e.g., with respect to FIGS. 2 and 3). The processor 402 is not limited to a single processing device and may encompass multiple processing devices. Similarly, the controller 144 is not limited to a single controller but may encompass multiple controllers.

The memory 404 includes one or more disks, tape drives, or solid-state drives, and may be used as an over-flow data storage device, to store programs when such programs are selected for execution, and to store instructions and data that are read during program execution. The memory 404 may be volatile or non-volatile and may include ROM, RAM, ternary content-addressable memory (TCAM), dynamic random-access memory (DRAM), and static random-access memory (SRAM). The memory 404 is operable (e.g., or configured) to store monitored temperatures 140, 146, 148, temperature rise values 150, temperature drop values 152, and thresholds 154 (i.e., including any of the threshold values, predefined ranges of values, predefined time periods, and the like described above with respect to FIGS. 1-3), and/or any other logic and/or instructions for performing the function described in this disclosure.

The I/O interface 406 is configured to communicate data and signals with other devices. For example, the I/O interface 406 may be configured to communicate electrical signals with components of the HVAC system 100 including the compressor 106, fan 110, expansion device 114, heating element 118, sensors 134a,b, blower 130, and thermostat(s) 136. The I/O interface may provide and/or receive, for example, compressor speed signals blower speed signals, temperature signals, relative humidity signals, thermostat calls, temperature setpoints, environmental conditions, and an operating mode status for the HVAC system 100 and send electrical signals to the components of the HVAC system 100. The I/O interface 406 may include ports or terminals for establishing signal communications between the controller 144 and other devices. The I/O interface 406 may be configured to enable wired and/or wireless communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A controller of a heating, ventilation, and air conditioning (HVAC) system configured to operate as a heat pump in a heating configuration, the controller communicatively coupled to:
   a discharge air temperature sensor positioned and configured to measure a discharge air temperature of a flow of air provided to a conditioned space;
   a return air temperature sensor positioned and configured to measure a return air temperature of air received from the conditioned space; and
   the controller configured to:
   determine whether the HVAC system is operating in a heating or cooling mode; and
   in response to determining that the HVAC system is operating in the heating mode:
      determine that the HVAC system has been operating in the heating mode for at least a predefined amount of time;
      receive the discharge air temperature measured by the discharge air temperature sensor;
      receive the return air temperature measured by the return air temperature sensor;
      determine a temperature rise value based on the discharge air temperature and the return air temperature;
      in response to determining that the temperature rise value is less than a first predefined minimum threshold value:
         detect at least one of an under-charging of the HVAC system with refrigerant and a high rate of the flow of air provided to the conditioned space to protect components of the HVAC system; and
         provide a first alert indicating detection of a first fault, wherein the first alert comprises an indication of one or more of the under-charging of the HVAC system with refrigerant and the high rate of the flow of air provided to the conditioned space; and
      in response to determining that the temperature rise value is greater than a predefined maximum threshold value:
         detect at least one of an over-charging of the HVAC system with refrigerant and a low rate of the flow of air provided to the conditioned space to protect the components of the HVAC system; and
         provide a second alert indicating detection of a second fault, wherein the second alert comprises an indication of one or more of the over-charging of the HVAC system with refrigerant and the low rate of the flow of air provided to the conditioned space; and in response to determining that the HVAC system is operating in the cooling mode:
      determine that the HVAC system has been operating in the cooling mode for at least the predefined amount of time;
      receive the discharge air temperature measured by the discharge air temperature sensor;
      receive the return air temperature measured by the return air temperature sensor;
      determine a temperature drop value based on the discharge air temperature and the return air temperature;
      in response to determining that the temperature drop value is less than a second predefined minimum threshold value:
         detect at least one of an under-charging of the HVAC system with refrigerant, a high rate of the flow of air provided to the conditioned space, and an expansion valve of the HVAC system being stuck in an open position to protect the components of the HVAC system; and
         provide a third alert indicating detection of a third fault, wherein the third alert comprises an indication of one or more of the under-charging of the HVAC system with refrigerant, the high rate of the flow of air provided to the conditioned space, and the expansion valve of the HVAC system being stuck in the open position; and
      in response to determining that the discharge air temperature is less than a predefined threshold value:
         detect at least one of a low rate of the flow of air provided to the conditioned space and an expansion valve of the HVAC system being stuck in a closed position to protect the components of the HVAC system; and
         provide a fourth alert indicating detection of a fourth fault, wherein the fourth alert comprises an indication of one or both of the low rate of the flow of air provided to the conditioned space and the expansion valve of the HVAC system being stuck in the closed position.

2. The controller of claim 1, further configured to, prior to providing the first alert, the second alert, the third alert, or the fourth alert:
   determine that the discharge air temperature changes by less than a threshold amount for a predefined time interval; and
   determine that the return air temperature changes by less than the threshold amount for the predefined time interval.

3. The controller of claim 1, further configured to:
   determine the temperature rise value as a difference between the discharge air temperature and the return air temperature; and
   determine the temperature drop value as a difference between the return air temperature and the discharge air temperature.

4. The controller of claim 1, further communicatively coupled to a thermostat configured to measure an indoor air temperature of the conditioned space;
   the controller further configured to:
   determine that the return air temperature is outside a predefined range of values; and
   in response to determining that the return air temperature is outside a predefined range of temperature values:

determine the temperature rise value as a difference between the discharge air temperature and the indoor air temperature; and
determine the temperature drop value as a difference between the indoor air temperature and the discharge air temperature.

5. The controller of claim 1, further configured to:
prior to determining that the first fault is detected, determine that the temperature rise value is less than the first predefined minimum threshold value for at least a threshold number of times;
prior to determining that the second fault is detected, determine that the temperature rise value is greater than the predefined maximum threshold value for at least the threshold number of times;
prior to determining that the third fault is detected, determine that the temperature drop value is less than the second predefined minimum threshold value for at least a threshold number of times; and
prior to determining that the fourth fault is detected, determine that the discharge air temperature is less than the predefined threshold value for at least the threshold number of times.

6. A controller of a heating, ventilation, and air conditioning (HVAC) system configured to operate as a heat pump in a heating configuration, the controller communicatively coupled to:
a discharge air temperature sensor positioned and configured to measure a discharge air temperature of a flow of air provided to a conditioned space;
a return air temperature sensor positioned and configured to measure a return air temperature of air received from the conditioned space; and
the controller configured to:
determine that the HVAC system is operating in a heating mode;
receive the discharge air temperature measured by the discharge air temperature sensor;
receive the return air temperature measured by the return air temperature sensor;
determine a temperature rise value based on the discharge air temperature and the return air temperature;
in response to determining that the temperature rise value is less than a first predefined minimum threshold value:
detect at least one of an under-charging of the HVAC system with refrigerant and a high rate of the flow of air provided to the conditioned space to protect components of the HVAC system; and
provide a first alert indicating detection of a first fault, wherein the first alert comprises an indication of one or more of the under-charging of the HVAC system with refrigerant and the high rate of the flow of air provided to the conditioned space; and
in response to determining that the temperature rise value is greater than a predefined maximum threshold value:
detect at least one of an over-charging of the HVAC system with refrigerant and a low rate of the flow of air provided to the conditioned space to protect the components of the HVAC system; and
provide a second alert indicating detection of a second fault, wherein the second alert comprises an indication of one or more of the over-charging of the HVAC system with refrigerant and the low rate of the flow of air provided to the conditioned space.

7. The controller of claim 6, further configured to, prior to providing the first alert or the second alert:
determine that the discharge air temperature changes by less than a threshold amount for a predefined time interval; and
determine that the return air temperature changes by less than the threshold amount for the predefined time interval.

8. The controller of claim 6, further configured to determine the temperature rise value as a difference between the discharge air temperature and the return air temperature.

9. The controller of claim 6, further communicatively coupled to a thermostat configured to measure an indoor air temperature of the conditioned space, wherein the controller is further configured to:
determine that the return air temperature is outside a predefined range of values; and
in response to determining that the return air temperature is outside a predefined range of temperature values, determine the temperature rise value as a difference between the discharge air temperature and the indoor air temperature.

10. The controller of claim 6, further configured to:
prior to determining that the first fault is detected, determine that the temperature rise value is less than the first predefined minimum threshold value for at least a threshold number of times; and
prior to determining that the second fault is detected, determine that the temperature rise value is greater than the predefined maximum threshold value for at least the threshold number of times.

11. A controller of a heating, ventilation, and air conditioning (HVAC) system configured to operate as a heat pump in a heating configuration, the controller communicatively coupled to:
a discharge air temperature sensor positioned and configured to measure a discharge air temperature of a flow of air provided to a conditioned space;
a return air temperature sensor positioned and configured to measure a return air temperature of air received from the conditioned space; and
the controller configured to:
determine that the HVAC system is operating in a cooling mode;
receive the discharge air temperature measured by the discharge air temperature sensor;
receive the return air temperature measured by the return air temperature sensor;
determine a temperature drop value based on the discharge air temperature and the return air temperature;
in response to determining that the temperature drop value is less than a second predefined minimum threshold value:
detect at least one of an under-charging of the HVAC system with refrigerant, a high rate of the flow of air provided to the conditioned space, and an expansion valve of the HVAC system being stuck in an open position to protect the components of the HVAC system; and
provide a first alert indicating detection of a first fault, wherein the first alert comprises an indication of one or more of the under-charging of the HVAC system with refrigerant, the high rate of the flow of air provided to the conditioned space, and the expansion valve of the HVAC system being stuck in the open position; and in response to determining that the discharge air temperature is less than a predefined threshold value:

detect at least one of a low rate of the flow of air provided to the conditioned space and an expansion valve of the HVAC system being stuck in a closed position to protect the components of the HVAC system; and provide a second alert indicating detection of a second fault, wherein the second alert comprises an indication of one or both of the low rate of the flow of air provided to the conditioned space and the expansion valve of the HVAC system being stuck in the closed position.

12. The controller of claim 11, further configured to, prior to providing the first alert or the second alert:

determine that the discharge air temperature changes by less than a threshold amount for a predefined time interval; and determine that the return air temperature changes by less than the threshold amount for the predefined time interval.

13. The controller of claim 11, further configured to determine the temperature drop value as a difference between the return air temperature and the discharge air temperature.

14. The controller of claim 11, further communicatively coupled to a thermostat configured to measure an indoor air temperature of the conditioned space, wherein the controller is further configured to:

determine that the return air temperature is outside a predefined range of values; and in response to determining that the return air temperature is outside a predefined range of temperature values, determine the temperature drop value as a difference between the indoor air temperature and the discharge air temperature.

15. The controller of claim 11, further configured to:

prior to determining that the third fault is detected, determine that the temperature drop value is less than the second predefined minimum threshold value for at least a threshold number of times; and prior to determining that the fourth fault is detected, determine that the discharge air temperature is less than the predefined threshold value for at least the threshold number of times.

\* \* \* \* \*